Patented Nov. 24, 1931

1,833,089

UNITED STATES PATENT OFFICE

HIKOSABURO MORIMOTO, OF MOMOYAMA-CHO, FUSHIMI-KU, KYOTO CITY, JAPAN

METHOD FOR CULTURING MUSHROOMS

No Drawing.   Application filed July 6, 1931. Serial No. 549,116.

This invention relates to a method for culturing mushrooms of various kinds ("*Pholiota adiposa*" and others) consisting in culturing spawns of mushrooms with culture media prepared with sawdusts and brans which are kneaded together with water, said media being sterilized before use. In nature, as is well known, mushrooms grow on certain decaying trunks in the autumn season only.

This invention has for its object to render the culture of mushrooms possible at any place and in any season whatever in a very simple but effective manner.

This invention is carried out as follows:

A culture medium is first prepared with sawdusts and brans which are kneaded together with water. Thus prepared the medium is then put in a glass vessel of a suitable size, which is to be sealed afterward with a cotton plug. The vessel with its contents is next subjected to a sterilizing operation through heating at about 120° C. for about 30 minutes. After cooling, the cotton plug is removed and a small quantity of spawns of mushrooms is planted over the culture medium contained in the glass vessel by means of a suitable tool such as a small teaspoon. Then, the vessel is placed in an incubator maintained at a temperature of about 21° C. In about 4 weeks, mycelium will be seen grown all over the surface of the culture medium and at this stage, the whole is taken out of the incubator, transferred to a moist place and kept there until mushrooms grow up fully.

In this manner, mushrooms can be cultured very simply as well as economically at any place and in any season whatever with cheap materials such as sawdusts and brans.

Having explained fully the nature of the present invention and in what manner the same may be carried out, what I claim is:

Method for culturing mushrooms with culture media which are prepared with sawdusts and brans which are kneaded together with water and are subjected to a sterilizing operation before use at a temperature above 100° C.

In testimony whereof I hereunto affix my signature.

HIKOSABURO MORIMOTO.